United States Patent Office 3,468,628
Patented Sept. 23, 1969

3,468,628
PROCESS FOR PRODUCING BORIC OXIDE
Robert W. Sprague, Santa Ana, Calif., assignor to United States Borax & Chemical Corporation, Los Angeles, Calif., a corporation of Nevada
No Drawing. Filed Aug. 11, 1966, Ser. No. 571,718
Int. Cl. C01b *15/12, 35/00*
U.S. Cl. 23—149                              5 Claims

ABSTRACT OF THE DISCLOSURE

Boric oxide is produced by heating an alkali metal or alkaline earth metal borate-sulfuric acid feed mixture in a furnace at a temperature above 750° C. to form two molten layers which are then separated and cooled. The $B_2O_3$ content of the product is increased if the feed is dried at a temperature of up to about 300° C. prior to feeding it to the furnace.

---

This invention relates to the production of boric oxide and, more particularly, it provides an improved process for producing boric oxide directly from alkali metal borates and sulfuric acid.

Boric oxide finds many uses in industry, especially in applications in which a high $B_2O_3$ content material, containing little or no oxides of the alkali or alkaline earth metals, is desired. Thus, the oxide is used in the production of many special glass compositions, enamels, alloys, in the preparation of fluxes, and as a catalyst in organic reactions. However, the price of boric oxide has remained relatively high because of the price of the raw materials as well as the complex processing conditions required for its production. Boric oxide is made commercially by heating boric acid at an elevated temperature over a relatively long period of time. The boric acid starting material is generally obtained by reaction of borax or colemanite with sulfuric acid or hydrochloric acid in an aqueous medium. Therefore, a simple straightforward process for making boric oxide directly from low-cost raw materials is considered to represent a significant advance in the art of inorganic borates.

Copending applications Ser. No. 432,652 filed Feb. 15, 1965, and now abandoned, and Ser. No. 563,015 filed June 22, 1966, of Lloyd L. Fusby disclose and claim a novel process for producing vitreous boric oxide directly from alkali metal and alkaline earth metal borates and sulfuric acid. In a preferred embodiment according to this process, concentrated sulfuric acid and hydrated sodium tetraborate can be combined in a mixing vessel to provide a feed mixture which is then heated to an elevated temperature of at least about 750° C. to form two molten layers. The upper molten layer is separated and cooled to provide the vitreous boric oxide product. A temperature of about 800° to about 1000° C. is generally preferred for forming the two molten layers.

The present invention provides an improvement in the process for preparing boric oxide from sulfuric acid and alkali or alkaline earth metal borates. According to this invention, the borate-sulfuric acid feed mixture is dried by heating at a temperature of up to about 300° C. prior to feeding to a furnace for formation of the two molten layers. The drying step is preferably sufficient to remove up to about one-half of the water present in the feed mixture. Preferably the feed mixture is heated at a temperature in the range of from about 100° to 250° C. The drying procedure results in a boric oxide product of higher purity than obtained without heating.

Preferably, about equimolar amounts of sulfuric acid and borate such as sodium tetraborate are employed in the feed preparation. Although slight excesses of either reactant can be used, it is preferred according to the present invention to use equimolar amounts or a slight excess of the borate. Preferably, concentrated sulfuric acid of at least about 90% $H_2SO_4$, usually about 93–98% $H_2SO_4$, is used. The resultant feed mixture is then heated by any convenient manner as by use of a drying oven, kiln, rotary calciner, etc.

The resultant borate-sulfuric acid reaction product mixture is then fed to a furnace and heated to an elevated temperature sufficient to form two molten layers, such as disclosed in the aforementioned copending applications of Lloyd L. Fusby. The upper layer, which is boric oxide, and the lower layer, which is sodium sulfate when a sodium borate is used as a reactant, are separated and cooled to provide the granular products.

The following examples illustrate the present process but the invention is not to be considered limited to the specific examples given.

EXAMPLE I

A feed mixture was prepared by combining about equimolar amounts of 95% $H_2SO_4$ with sodium tetraborate pentahydrate. Analysis of the resultant feed mixture showed that it contained a deficiency of acid in an amount equal to 0.93% of the total weight of feed. Upon fusion of a portion of this feed at 1000° C. in a crucible, and separation of the two layers, the boric oxide layer was found to contain 93.3% $B_2O_3$ and 3.8% $Na_2O$. A portion of the feed was dried at 110° C. for 12 hours. Upon fusion of this dried feed, and separation of the layers, the boric oxide layer was found to contain 94.5% $B_2O_3$ and 3.5% $Na_2O$.

EXAMPLE II

A feed mixture was prepared as in Example I and was found to contain a slight excess of sulfuric acid equal to 0.06% of the weight of feed. Upon fusing a portion of the feed mixture at 1000° C., the boric oxide layer was found to contain 93.6% $B_2O_3$ and 3.9% $Na_2O$. After drying a portion of the feed mixture at 110° C. for 12 hours, and then fusing at 1000° C., the boric oxide layer was found to contain 94.9% $B_2O_3$ and 2.6% $Na_2O$. When another portion was dried for 12 hours at 200° C. and then fused at 1000° C., the boric oxide layer was found to contain 95.4% $B_2O_3$ and 2.7% $Na_2O$.

EXAMPLE III

A feed mixture prepared as in the preceding examples was found to contain excess acid equal to 1.7% of the feed mixture weight. Upon fusion at 1000° C., the boric oxide layer was found to contain 96.7% $B_2O_3$ and 1.5% $Na_2O$. After drying 12 hours at 110° C., and fusing at 1000° C., the boric oxide layer was found to contain 96.6% $B_2O_3$ and 2.5% $Na_2O$. After drying at 150° C. for 12 hours, and fusing at 1000° C., the boric oxide layer was found to contain 96.9% $B_2O_3$ and 1.9% $Na_2O$.

What is claimed is:

1. In the process for producing boric oxide by heating a metal borate-sulfuric acid feed mixture, formed by combining about equimolar amounts of metal borate and sulfuric acid, to an elevated temperature of at least about 750° C. in a furnace to form two molten layers, and separating said molten layers to give boric oxide, the improvement which comprises heating said metal borate-sulfuric acid feed mixture at a temperature of up to about 300° C. prior to feeding to said furnace to remove up to about one-half of the water in the feed mixture and then heating the dried feed mixture at said elevated temperature to form two molten layers, where said metal borate is selected from the group consisting of the alkali metal and alkaline earth metal borates.

2. The process according to claim 1 in which said metal borate is sodium borate.

3. The process according to claim 1 in which said metal borate is sodium tetraborate pentahydrate.

4. The process according to claim 1 in which said feed mixture is heated at a temperature of from about 100° to 250° C.

5. The process according to claim 1 in which said metal borate-sulfuric acid feed mixture contains a slight molar excess of the metal borate.

References Cited

UNITED STATES PATENTS 1,950,106  3/1934  Franke _____ 23—149

OTHER REFERENCES

Slavyanskii (1), pp. 1–8 of Translation of Zhurnal Fizicheskoi Khimii, vol. 30, No. 9, 1956, pp. 2046–2050.

Slavyanskii (2), pp. 1–7 of Translation of Zhurnal Fizicheskoi Khimii, vol. 30, No. 10, 1956, pp. 2248–2250.

HERBERT T. CARTER, Primary Examiner

U.S. Cl. X.R.

23—121, 122